3,222,199
STABILIZATION OF AMYLOSE
Lawrence J. Hickey, Livingston, N.J., assignor to National Starch and Chemical Corporation, New York, N.Y., a corporation of Delaware
No Drawing. Filed May 4, 1962, Ser. No. 192,334
18 Claims. (Cl. 106—213)

This invention relates to a method for the stabilization of amylose solutions and to the stabilized amylose solutions thus prepared.

It is well known that starch is composed of two fractions, the molecular arrangement of one being linear and that of the other being branched. The linear fraction of starch is known as amylose, and the branched fraction as amylopectin. Methods for separating starch into these two components are known. Starches from different sources (e.g., potato, corn, waxy maize, etc.) are characterized by different relative proportions of the amylose and amylopectin component. Some starches have been genetically developed which are characterized by a large preponderance of the one fraction over the other.

When we use the term "amylose," for the purposes of this invention, we refer to the amylose resulting from the separation of the amylose and amylopectin components of starch, or to whole starch which is composed of at least 55% amylose. The latter, because of its high amylose content, offers the advantages and presents the problems found in substantially pure amylose.

Ordinary starch (that is, starch derived from corn, tapioca, potato, sago and similar plant forms, and containing from about 17% to about 34% amylose) may be dispersed quite easily in water, merely by heating. Heating the aqueous suspension of the starch causes the individual granules to swell until the internal organization of the starch granule is destroyed, this being the well known phenomenon of gelatinization, and a hydrated colloidal dispersion of the starch is thus obtained.

For some applications, such as the preparation of coatings and self-supporting films, it is desirable to use amylose because of the water resistant properties it imparts to the resulting products. Difficulty is encountered, however, in forming aqueous dispersions of amylose. Unlike starch, which disperses rapidly upon heating in water, mere cooking in water will not disperse amylose completely. When amylose is heated in water at low concentrations, for example, at 10% solids in an autoclave, under super-atmospheric pressure at about 75 lbs. gauge pressure, it does form a dispersion. However, the dispersion is quite unstable, as is evidenced by the fact that it forms a solid gel upon cooling.

The reason for the difficulty in dispersing amylose is believed to be the linear configuration of the amylose molecules. This linearity allows the molecules to align themselves, forming many hydrogen bonds between the aligned chains and thus becoming insoluble in water. This accounts for the difficulty in dispersing amylose in water (whether the amylose be the result of the fractionation of starch or whether it is part of a whole starch containing a high amylose ratio); it also explains the tendency of dispersed amylose to gel or precipitate.

Amylose in the dispersed form also exhibits a high degree of instability, and, on standing for short periods of time, amylose in solution will precipitate from the solution. Previous attempts to prepare stable solutions of amylose have involved the addition of formaldehyde or treatment with alkali. Unfortunately, however, these early efforts to stabilize amylose dispersions resulted in products which could not be utilized in several important applications which necessitated their formulation with cooked starch, raw starch slurries, clay slips, various salts, organic and inorganic fibers, and similar materials. Thus, the amylose precipitated from these dispersions upon being combined with any of the aforedescribed materials. In addition, films cast from the amylose dispersions heretofore produced were inferior with respect to their water resistance, flexibility, gloss, hardness, heat sealability, and water insolubility. On the whole, therefore, it may be said that amylose solutions stabilized by the methods heretofore used have been generally unsatisfactory in most applications.

It is an object of this invention to provide an economical and effective method for stabilizing amylose solutions. Another object of this invention is to provide stable amylose solutions which may be used in a variety of applications without any limitations on the materials with which they may be formulated. A further object of this invention is to provide stable amylose solutions which enable films of enhanced physical characteristics to be cast therefrom.

In accordance with this invention, slurries or dispersions of amylose are mixed with paraformaldehyde and urea, or their operable equivalents, under conditions of alkaline pH. The resulting amylose solutions are found surprisingly to be highly stable and can be maintained for extended periods of time without any appreciable settling or retrogradation of the amylose. Moreover, this stability is retained even when these solutions are formulated with such materials as cooked starch, raw starch slurries, clay slips, inorganic and organic fibers, and various salts. Furthermore, films cast from these solutions generally possess a high degree of flexibility, water insolubility, hardness, heat sealability, and other desirable characteristics. Although the discussion which follows hereinafter describes my process with respect to the use of paraformaldehyde and urea, it is to be noted that various operable equivalents, hereinafter described, can also be used as replacements for each of these reagents. In addition, the process of this invention is applicable to amylose that has been dispersed either by cooking under high pressure, i.e., autoclaving, or by treatment with alkali at atmospheric pressure. In general, the method by which the amylose is dispersed will have no effect upon the overall results achieved by my stabilization process; however, as will be subsequently noted, the manner in which the amylose is dispersed will result in some minor variations in the procedure by which my process is carried out. In particular, the manner of dispersion will be found to influence the order in which the alkali and stabilizing agents of this invention are added to the dispersed amylose slurry. It should be noted at this point that, when reference is made to amylose dispersions or solutions, such reference comprehends, in effect, hydrated colloidal dispersions. Although amylose cannot form true ionic solutions, such hydrated colloidal dispersions of amylose are commonly referred to as dispersions or solutions.

I have also discovered that incorporation of certain salts in amylose solutions, either during or after stabilization of the solutions, brings about several desirable effects. The incorporation of these salts in amylose solutions of our invention enables a reduced pH to be maintained without significantly affecting their stability.

In addition, the use of these salts reduces the viscosity of the amylose solutions, and, in some instances, these salts may act as auxiliary stabilizing agents. The salts that may be incorporated in the amylose solutions stabilized by my procedure include ammonium salts and water soluble salts of alkali and alkaline earth metals such as the chlorides, nitrates, and acetate salts of these metals. The amount of salt used in my procedure may vary from about 0.1% to about 125% as based on the weight of amylose. Ammonium hydroxide can also be added to amylose solutions stabilized by the method of my invention in order to increase the pH of the solution without detrimentally affecting the stability of the solution. It is to be noted, moreover, that ammonium hydroxide could not be added to amylose solutions stabilized by methods heretofore employed, e.g., addition of formaldehyde, without immediate gelling and instability of the solutions.

The method of this invention is applicable to the stabilization of pure amylose resulting from the separation of the amylose and amylopectin components of starch, as well as whole starches containing at least 55% of amylose. When solutions of amylose prepared by pressure cooking are stabilized by my method, it is found that the stability achieved increases with an increase in the amylose content of the starch. On the other hand, when solutions of amylose prepared by alkali treatment are stabilized by my method, the stability achieved increases with decreasing amylose content of the starch.

Although there is no critical range of solids content for the aqueous amylose dispersions operable in this process, I have obtained excellent results using dispersions containing from about 1% to about 35% amylose solids, based on the total weight of the dispersion. Of course, if the viscosity of the dispersion is reduced, then dispersions of higher solids content can be prepared.

Paraformaldehyde or an operable equivalent is used as part of the stabilizing system in the process of this invention. Fully operable equivalents of paraformaldehyde which may be used include aqueous solutions of formaldehyde stabilized with methanol, aqueous solutions of methanol-free formaldehyde, and commercially available non-polymeric aqueous urea-formaldehyde concentrates, these concentrates having a weight ratio of urea to formaldehyde of from 1:0.25 to 1:2.5. The paraformaldehyde, or its fully operable equivalents, can be partially replaced by certain aldehydes, such as glyoxal, acetaldehyde, furfural, benzaldehyde, and the like. In order to produce amylose solutions of unlimited stability, as much as 60% of the paraformaldehyde may be replaced by these aldehydes. In the procedure utilizing amylose dispersed by treatment with alkali at atmospheric pressure, the paraformaldehyde may be entirely replaced by glyoxal to yield a mixture of only limited stability.

In addition to the paraformaldehyde, urea (or an operable equivalent thereof) is employed as a component of the stabilizing system of my invention. Fully operable equivalents of urea which may be used as complete replacements therefor include: monomethylol urea, succinamide, adipamide, and similar compounds. Urea or its fully operable equivalents can be partially replaced by compounds such as: thiourea; cyclic urea compounds, such as dimethylol ethylene urea and ethyl triazone; trimethylol alkyl and aryl compounds, such as trimethylol propane and trimethylol phenol; dicyandiamide; melamine; hydrazine hydrate; morpholine; ethylene glycol; water soluble alcohols; ketones, such as acetone; primary and secondary amines; and similar compounds. Of particular utility as complete or partial replacements of urea in my stabilizing mixtures are those basic nitrogen compounds that form N-methylol derivatives with formaldehyde or formaldehyde-type compounds. In order to produce amylose solutions of unlimited stability, as much as 50% of the urea may be replaced by these partial equivalents.

The concentration of the stabilizing agents of my invention will vary with the type of dispersed amylose that is used. The concentration ranges given hereinafter refer only to the concentration of paraformaldehyde and urea in my stabilizing systems. It is to be understood that these ranges may vary somewhat when operable equivalents of the paraformaldehyde and/or urea are employed. When solutions of amylose dispersed by pressure treatment are treated by means of my method, the preferred concentrations of paraformaldehyde and urea may vary in amounts ranging from 32 to 100 parts of urea: 25 to 35 parts of paraformaldehyde per 100 parts of amylose. In terms of moles of reactants, the mole ratio of urea to paraformaldehyde may vary from 1:4 to 3:1. When solutions of amylose dispersed by alkali treatment at atmospheric pressure are processed according to my method, the preferred concentrations of paraformaldehyde and urea, or their operable equivalents, may vary from 8 to 100 parts of urea: 10.7 to 42.8 parts of paraformaldehyde per 100 parts of amylose. In terms of moles of reactants, the mole ratio of urea to paraformaldehyde may vary from 1:4 to 3:1.

Although amylose solutions prepared by alkali treatment will remain stable for several days without the addition of any stabilizing agents, such solutions will exhibit instability when they are added to cooked starch, raw starch slurries, clay slips, and the like. Also, films cast from these solutions exhibit poor properties of flexibility, water insolubility, gloss, hardness, heat sealability, and the like. The addition of the stabilizing composition of my invention to solutions of alkali-dispersed amylose is therefore necessary in order to prevent settling of the amylose when the solution is subjected to further processing involving, for example, the addition of materials such as those previously described, which ordinarily are incompatible with the stabilized amylose solutions prepared by prior art techniques. The addition of my stabilizing composition is also necessary in order to enable films to be cast that exhibit the desirable characteristics previously mentioned. It is to be understood that the the ranges presented hereinabove represent the preferred ratios of the stabilizing agents in the method of my invention. The amount of urea or paraformaldehyde used may vary considerably from the preferred ranges given above. In fact, it is possible to use as much as 200 parts of each stabilizer component per 100 parts of amylose. However, for optimum results, it is suggested that the preferred ranges of stabilizer previously set forth be used. When salts such as those described hereinabove are incorporated in the amylose solutions, an excess of urea, usually up to 75% by weight based on the weight of amylose, must be employed in order to attain proper stability in the resulting formulation.

As was mentioned previously, certain commercially available non-polymeric aqueous urea-formaldehyde concentrates may be used in the stabilizing mixture of this invention. When these concentrates are employed, additional urea is added in order to bring the ratio of the urea to formaldehyde within the effective concentration range set forth above. It was found that an effective stabilizer for amylose could be produced by the use of a quantity of the urea-formaldehyde concentrate and excess urea which results in a mixture having a mole ratio of urea to formaldehyde of 2.5:3. The process of this invention is applicable to amylose that has been dispersed either by pressure treatment or by treatment with alkali at atmospheric pressure. In those instances where the amylose has been dispersed by high pressure cooking, alkali is added, not as a means for dispersing the amylose, but in order to obtain a solution having an alkaline pH. Where the amylose is dispersed by alkali treatment at atmospheric pressure, additional alkali is similarly used to obtain the desired pH in the resulting solution.

The maintenance of an alkaline pH in the amylose solution is necessary in order that a stable solution be produced. Where the urea-paraformaldehyde system is used to stabilize a pressure cooked dispersed amylose solution, it is necessary to maintain the pH at 9.5 or above. Any alkaline material that can effect this pH may be employed in the process of my invention. Thus, sodium hydroxide, potassium hydroxide, sodium carbonate, sodium silicate, sodium phosphate, and similar reagents may be employed as the alkali. When pressure cooked amylose solutions are to be stabilized, no more than about 8% of alkali, based on the weight of amylose, is necessary. When salts such as those previously mentioned are incorporated in the stabilized amylose solution, the pH of the solution can be reduced to about 4.0, and, after maintaining the solution at this pH for several hours, the pH may then be increased to about 9.0 without detrimentally affecting the stability of the solution.

In stabilizing solutions of dispersed amylose prepared by alkali treatment at atmospheric pressure, it is necessary to maintain a minimum pH of 11. A strong alkaline compound, e.g. sodium hydroxide or potassium hydroxide, is needed to obtain this pH. The amount of alkaline material used may vary from about 5% to about 30% based on the weight of amylose. When the amount of alkali to be added exceeds 8%, based on the weight of amylose, the excess alkali must be added at room temperature in order to prevent degradation of the amylose by the high alkali concentration at the elevated temperatures that are utilized. The exact amount of alkali used is dependent on the temperature and time of the reaction. Thus, for example, when the stabilizer mixture and amylose solution are combined at a temperature of about 140° F. for a period of about 5 minutes, it is necessary to employ from 15% to 23% of alkali. When temperatures of about 200° F. are employed, 5% of alkali is usually sufficient to stabilize the solution. At room temperature, on the other hand, about 30% of alkali is necessary for proper stabilization of the solution.

As was noted earlier, the manner in which this invention is carried out is subject to a number of variations which are primarily dependent upon the method used for the dispersion of the amylose. Thus, when amylose solutions prepared at atmospheric pressure are to be stabilized, the stabilizing agents of my invention may be added individually or in combination and in any desired sequence, either before or after the addition of alkali and/or amylose. Usually, however, these alkali prepared amylose dispersions are mixed with the stabilizer system over a period of thirty minutes at a temperature of about 140° F. Pressure cooked amylose solutions, however, may be treated in several ways. For example, in one variation paraformaldehyde may be mixed with an amylose slurry, the resulting mixture thereafter being cooked at 330° F. for 20 minutes under conditions of elevated pressure. The cooked clear fluid is then added to a container immersed in a water bath maintained at a temperature of from 160° to 190° F. The required amounts of urea and alkali are then simultaneously added to the mixture which is agitated for a period of time which may vary from 1 minute to 1 hour while the pH is maintained above 9.5. The foregoing procedure is generally preferred when pressure cooked amylose solutions are to be stabilized. In another variation, the amylose slurry may be pressure cooked for 20 minutes and the cooked clear fluid poured into a container immersed in a water bath maintained at a temperature of from 160° to 190° F. The required amounts of paraformaldehyde, urea, and alkali are then added simultaneously to the amylose solution. In still another variation, the required amount of paraformaldehyde may be added to the previously pressure cooked amylose solution, the resulting mixture cooled to 160° F., with the required amounts of urea and alkali thereafter being added simultaneously to the mixture. It will be noted that urea is not ordinarily dissolved in a mixture that is to be subsequently exposed to conditions of elevated temperature and pressure, since the urea, under such conditions, will decompose to form ammonia which then reacts with formaldehyde to form hexamethylene tetramine, a compound whose presence results in the retrogradation or precipitation of the amylose. However, the previously described non-polymeric urea-formaldehyde concentrates can withstand elevated temperatures and pressures without decomposition. It should also be noted that the urea and paraformaldehyde may be added to the dispersed amylose in any form, that is, as solids or dissolved in an aqueous solution.

As was noted previously, certain salts may be added to the amylose solutions in order to impart several desirable characteristics to the solutions. These salts may be added to alkali prepared amylose solutions in any desired sequence, either before or after the addition of alkali and/or amylose. These salts may also be added along with the amylose and formaldehyde during pressure cooking or they may be included after the urea has been incorporated in the solution.

The length of time which may elapse between the dispersion and stabilization of the amylose is also subject to some variance. If the dispersed pressure cooked amylose solution is kept sufficiently hot so as to prevent retrogradation, then an indefinite period of time can precede the stabilization treatment. However, since long exposure of amylose to elevated temperatures causes the degradation of the amylose, the stabilization of pressure cooked amylose is usually undertaken a short time after its dispersion. Amylose solutions prepared at atmospheric pressures may be kept at room temperature for several days before stabilization treatment. However, since prolonged contact between amylose and alkali results in oxidative degradation of amylose, the stabilization of alkali dispersed amylose should also be undertaken within a short period after dispersion.

Because of the properties imparted to amylose solutions by the stabilizing systems of this invention, such solutions can now be used in a variety of applications. Stabilized amylose solutions can be used in paper coatings, wet end additives, surface sizings, binders for building products, adhesives, and similar applications. As was mentioned previously, films cast from these amylose solutions exhibit enhanced properties of flexibility, water resistance, gloss, hardness, heat sealability, and the like. The extent to which the aforedescribed properties are imparted to the amylose-based films may be varied to conform to the exigencies of any particular application wherein the mixture is to be utilized.

In the following examples, which further illustrate the embodiment of my invention, all parts given are by weight unless otherwise indicated.

*Example 1*

This example illustrates the use of various alkalis in the stabilization of a pressure cooked amylose solution according to the process of my invention.

The procedure set forth hereinafter was followed in the preparation of each of the formulations described in this example, with the exception that different alkalis and varying concentrations thereof were employed therein.

In following this basic procedure, a slurry of 200 parts of water, 22.2 parts of amylose, and 7.76 parts of paraformaldehyde was heated for 10 minutes in a boiling water bath. A 100 cc. portion of the slurry was then placed in an autoclave and heated under pressure at 330° F. for 20 minutes. At the completion of the pressure treatment, the autoclave was cooled by immersion in a boiling water bath for 3 minutes. The clear cooked solution, after being mixed for 5 minutes, was then added to a container immersed in a water bath maintained at a temperature of 160° F. At this point, 5.8 parts of urea per 100 parts of slurry and a specified amount of an alkaline compound were added to the amylose solution and mixed for 30 minutes at a temperature of 160° F.

The following table lists the alkalis used, the concentrations thereof, and the pH of the resulting solutions.

| Formulation No. | Alkali | Concentration of alkali (parts/100 parts of slurry) | pH of Solution |
|---|---|---|---|
| 1 | Sodium hydroxide | 0.25 | 10.4 |
| 2 | Potassium hydroxide | 0.25 | 10.8 |
| 3 | Sodium carbonate | 1.00 | 10.3 |
| 4 | Sodium silicate | 1.50 | 10.2 |
| 5 | Sodium phosphate | 1.50 | 10.6 |

In each formulation set forth in the above table, amylose solutions were obtained which exhibited a high degree of stability for at least 6 months and longer, even when subsequently mixed with other additives, such as cooked starch, raw starch slurries, and the like. In addition, among the desirable characteristics shown by the films cast from these solutions were included flexibility, water resistance, gloss, hardness, and heat sealability.

*Example II*

This example illustrates the use of various alkalis in the process of my invention, whereby solution of amylose dispersed by alkali treatment at atmospheric pressure, rather than by high pressure treatment, were stabilized.

The procedure set forth herein after was followed in the preparation of each of the formulations described in this example, with the exception that different alkalis and varying concentrations thereof were employed therein.

In following this basic procedure, a slurry of water, amylose, and alkali was heated in order to disperse the amylose at varying temperatures and for varying lengths of time, as set forth in the following table.

mixing with other additives, such as cooked starch, raw starch slurries, and the like remained stable for extended periods of time. In addition, among the desirable characteristics shown by films cast from each solution were included strength, flexibility, water resistance, gloss, hardness, and heat sealability. The use of the high alkali concentration was accompanied by a decrease in stability due to the resulting increase in viscosity. However, on dilution with water, the solution was stable indefinitely.

*Example III*

This example illustrates the application of the process of my invention to the stabilization of high amylose content starches which have been dispersed by pressure cooking.

The procedure set forth hereinafter was followed in the preparation of each of the formulations described in this example, with the exception that starches of varying amylose content were utilized.

In following this basic procedure, an aqueous slurry containing paraformaldehyde and a high amylose corn starch was heated for 10 minutes in a boiling water bath. A 100 cc. portion of this slurry was then placed in an autoclave and heated at a temperature of 330° F. and at a gauge pressure of 90 p.s.i. for a period of 20 minutes. At the completion of the pressure treatment, the autoclave was cooled by immersion in a boiling water bath for 3 minutes. The clear, cooked solution, after being mixed for 5 minutes, was added to a container immersed in a water bath maintained at a temperature of 160° F. Thereupon urea and alkali were added to the amylose solution, and the resulting mixture agitated for 30 minutes at a temperature of 160° F.

| Formulation No. | Initial composition of slurry | | | | Stabilization treatment of pressure cooked amylose solution | | |
|---|---|---|---|---|---|---|---|
| | Water | Paraformaldehyde | Starch | Percent amylose in starch | Urea | Sodium hydroxide | pH |
| 1 | 200 | 7.8 | 22.2 | 100 | 11.5 | 0.5 | 10.8 |
| 2 | 200 | 7.8 | 22.2 | 75 | 11.5 | 0.5 | 11.5 |
| 3 | 200 | 7.8 | 22.2 | 55 | 11.5 | 0.5 | 11.5 |

In each formulation set forth in the above table, highly stable amylose solutions were obtained, which, on mixing with other additives, such as cooked starch, raw starch slurries, and the like remained stable for at least 2 weeks. In addition, among the desirable characteristics shown by films cast from each solution were included strength,

| Formulation No. | Initial composition of slurry | | | | Treatment of dispersed slurry | | |
|---|---|---|---|---|---|---|---|
| | Water | Amylose | Sodium hydroxide | Potasium hydroxide | Temperature (Degrees F.) | Time | Percent alkali used (on weight of amylose) |
| 1 | 100 | 13 | 0.39 | | 200 | 20 min | 3 |
| 2 | 100 | 13 | 3.90 | | 80 | 3 hr | 30 |
| 3 | 100 | 13 | 2.00 | | 140 | 5 min | 15 |
| 4 | 100 | 13 | | 0.39 | 200 | 20 min | 3 |
| 5 | 100 | 13 | | 3.90 | 80 | 3 hr | 30 |
| 6 | 100 | 13 | | 2.00 | 140 | 5 min | 15 |

Following this treatment, 2.7 parts of paraformaldehyde and 3.5 parts of urea were added to each of the amylose solutions, and the resulting mixtures were then heated at 140° F. for 30 minutes.

In each formulation set forth in the above table, amylose solutions were obtained which exhibited a high degree of stability for at least 1 to 6 weeks, and which, on flexibility, water resistance, gloss, hardness, and heat sealability.

*Example IV*

This example illustrates the application of the process of my invention to the stabilization of amylose or high amylose content starches which have been dispersed by treatment with alkali at atmospheric pressure.

The procedure set forth hereinafter was followed in the preparation of each of the formulations described in this example, with the exception that starches of varying described in the table that follows, with the exception that various operable equivalents of paraformaldehyde were employed in the stabilizer mixtures.

| Formulation No. | Initial composition of slurry | | | | Stabilization treatment of pressure cooked dispersed amylose solution | | |
|---|---|---|---|---|---|---|---|
| | Water | Amylose | Formaldehyde compound | | Urea | Sodium hydroxide | pH |
| | | | Type | Parts | | | |
| 1 | 200 | 22.2 | Paraformaldehyde | 7.76 | 11.5 | 0.5 | 10.4 |
| 2 | 187 | 22.2 | Methanol stabilized 37% aqueous formaldehyde solution. | 21 | 11.5 | 0.5 | 10.8 |
| 3 | 187 | 22.2 | Methanol free 37% aqueous formaldehyde solution. | 21 | 11.5 | 0.5 | 10.7 | amylose content were employed. In following this basic procedure, a slurry of water, amylose or a high amylose content starch and sodium hydroxide was heated in a water bath at 140° F. for 5 minutes. Paraformaldehyde and urea were then added to the solution and mixed at 140° F. for 30 minutes.

In each formulation set forth in the above table, amylose solutions were obtained which were stable for at least 6 months and longer, and which on mixing with other additives remained stable for extended periods of time. In addition, among the desirable characteristics shown by films cast from these solutions were included strength,

| Formulation No. | Initial composition of slurry | | | | Stabilizers added to dispersed amylose slurry | |
|---|---|---|---|---|---|---|
| | Water | Sodium hydroxide | Starch | Percent amylose in Starch | Paraformaldehyde | Urea |
| 1 | 99 | 0.23 | 1 | 100 | 0.21 | 0.27 |
| 2 | 80 | 4.6 | 20 | 100 | 4.2 | 5.4 |
| 3 | 99 | 0.23 | 1 | 75 | 0.21 | 0.27 |
| 4 | 80 | 4.6 | 20 | 75 | 4.2 | 5.4 |
| 5 | 99 | 0.23 | 1 | 55 | 0.21 | 0.27 |
| 6 | 80 | 4.6 | 20 | 55 | 4.2 | 5.4 |

In each formulation set forth in the above table, highly stable amylose solutions were obtained, which, on mixing with other additives, such as cooked starch, raw starch slurries, and the like remained stable for at least 2 weeks. In addition, among the desirable characteristics shown by films cast from these solutions were included strength, flexibility, water resistance, gloss, hardness, and heat sealability.

*Example V*

This example illustrates the application of the process of my invention to the stabilization of amylose using paraformaldehyde, and operable equivalents thereof, in the stabilizer mixture.

(a) The basic procedure set forth in Example III was followed in the preparation of each of the formulations flexibility, water resistance, gloss, hardness, and heat sealability.

(b) The procedure set forth hereinafter was followed in the preparation of each of the formulations descirbed in this part of the example, with the exception that various operable equivalents of paraformaldehyde were employed in the stabilizer mixture.

In following this basic procedure, a slurry of water, amylose, and sodium hydroxide was heated at 140° F. for 5 minutes in order to disperse the amylose. Then urea and paraformaldehyde, or an operable equivalent thereof were added to the amylose solution, and the resulting mixture was heated at 140° F. for 30 minutes. The table set forth hereinafter presents the equivalents of paraformaldehyde that were utilized.

| Formulation No. | Initial composition of slurry | | | Stabilizer mixture for the dispersed amylose solution | | | |
|---|---|---|---|---|---|---|---|
| | Water | Amylose | Sodium hydroxide | Parts urea | Formaldehyde compound | Percent formaldehyde (on wt. of amylose) | Parts formaldehyde compound |
| 1 | 100 | 13 | 2.2 | 2.1 | Paraformaldehyde | 10.7 | 1.4 |
| 2 | 100 | 13 | 2.2 | 2.1 | Methanol stabilized 37% aqueous formaldehyde solution. | 10.7 | 3.8 |
| 3 | 100 | 13 | 2.2 | 2.1 | Methanol free 37% aqueous formaldehyde solution. | 10.7 | 3.8 |
| 4 | 100 | 13 | 2.2 | 7.5 | Paraformaldehyde | 42.8 | 5.6 |
| 5 | 100 | 13 | 2.2 | 7.5 | Methanol stabilized 37% aqueous formaldehyde solution. | 42.8 | 15.2 |
| 6 | 100 | 13 | 2.2 | 7.5 | Methanol free 37% aqueous formaldehyde solution. | 42.8 | 15.2 |

In each formulation set forth in the above table, amylose solutions were obtained which are stable for at least one week (due to viscosity increase), and which on mixing with other additives, such as cooked starch, raw starch slurries, and the like remained stable for extended periods of time. In addition, among the desirable characteristics shown by films cast from these solutions were included strength, flexibility, water resistance, gloss, hardness, and heat sealability.

*Example VI*

This example illustrates the application of the process of my invention to the stabilization of amylose using urea, and operable equivalents thereof, in the stabilizer mixture.

(a) The basic procedure set forth in Example III was followed in the preparation of each of the formulations described in this part of the example, with the exception that various operable equivalents of urea were employed in the stabilizer mixtures.

| Formulation No. | Initial composition of slurry | | | Stabilization treatment of pressure cooked amylose solution | | | |
|---|---|---|---|---|---|---|---|
| | Water | Amylose | Paraformaldehyde | Urea equivalent | Parts of urea equivalent | Parts of sodium hydroxide | pH |
| 1 | 200 | 22.2 | 7.76 | Urea | 11.5 | 0.5 | 10.4 |
| 2 | 200 | 22.2 | 7.76 | Succinamide | 22.0 | 0.5 | 10.1 |
| 3 | 200 | 22.2 | 7.76 | Adipamide | 27.0 | 0.5 | 10.9 |
| 4 | 200 | 22.2 | 7.76 | Monomethylol urea | 17.0 | 0.5 | 10.3 |

In each formulation set forth in the above table, amylose solutions were obtained which were stable for at least 8 weeks, and which, on mixing with other additives, remained stable for extended periods of time. In addition, among the desirable characteristics shown by films cast from these solutions were included flexibility, water resistance, gloss, hardness, and heat sealability.

(b) The procedure set forth hereinafter was followed in the preparation of each of the formulations described in this part of the example, with the exception that various operable equivalents of urea were employed in the stabilizer mixture.

In following this basic procedure, a slurry of water, amylose, and sodium hydroxide was heated at 140° F. for 5 minutes in order to disperse the amylose. Then paraformaldehyde and urea, or an operable equivalent thereof, were added to the amylose solution, and the resulting mixture was heated at 140° F. for 30 minutes. The table set forth hereinafter presents the equivalents of urea that were utilized.

| Formulation No. | Initial composition of slurry | | | Stabilizers added to the amylose slurry | | |
|---|---|---|---|---|---|---|
| | Water | Sodium hydroxide | Amylose | Urea equivalent | Parts of urea equivalent | Parts of paraformaldehyde |
| 1 | 100 | 2.2 | 13 | Urea | 1.04 | 2.7 |
| 2 | 100 | 2.2 | 13 | do | 7.5 | 5.6 |
| 3 | 100 | 2.2 | 13 | Succinamide | 1.55 | 2.7 |
| 4 | 100 | 2.2 | 13 | do | 7.5 | 5.6 |
| 5 | 100 | 2.2 | 13 | Adipamide | 19.0 | 5.6 |
| 6 | 100 | 2.2 | 13 | Monomethylol urea | 12.0 | 5.6 |

In each formulation set forth in the above table, amylose solution were obtained which were stable for at least 2 weeks, and which, on mixing with other additives, such as cooked starch, raw starch slurries, and the like, remained stable for extended periods of time. In addition, among the desirable characteristics shown by films cast from these solutions were included strength, flexibility, water resistance, gloss, hardness and heat sealability.

*Example VII*

This example illustrates the application of the process of my invention to the stabilization of amylose using non-polymeric aqueous urea-formaldehyde concentrates in the stabilizer mixture.

(a) A slurry of 200 parts of water and 22.2 parts of amylose was heated for 10 minutes in a boiling water bath. Then a 100 cc. portion of the slurry was placed in an autoclave and heated at a temperature of 330° F. and at a gauge pressure of 90 p.s.i. for 20 minutes. At the completion of the pressure treatment, the autoclave was cooled by immersion in a boiling water bath for 3 minutes. The clear cooked solution was then added to a container immersed in a water bath maintained at a temperature of 160° F. At this point, 13 parts of an aqueous urea-formaldehyde concentrate containing 85% by weight of urea and formaldehyde, which were present therein in a weight ratio of 26 parts of urea to 59 parts of formaldehyde, were added to the solution, the resulting mixture then being mixed for 5 minutes. Then 0.5 part of sodium hydroxide were added to the solution and mixed for 30 minutes at a temperature of 160° F., yielding a solution having a pH of 11.2.

The amylose solution obtained from the above procedure was stable for at least four weeks, and, on mixing with other additives, such as cooked starch, raw starch slurries, and the like, the amylose solution remained stable for extended periods of time. In addition, among the desirable characteristics shown by films cast from this solution were included flexibility, water resistance, gloss, hardness, and heat sealability.

(b) A slurry of 200 parts of water and 22.2 parts of amylose was heated for 10 minutes in a boiling water bath. Then a 100 cc. portion of the slurry was placed in an autoclave and heated at a temperature of 330° F. and at a guage pressure of 90 p.s.i. for 20 minutes. At the completion of the pressure treatment, the autoclave was cooled by immersion in a boiling water bath for 3 minutes. The clear cooked solution was then added to a container immersed in a water bath maintained at a temperature of 160° F. At this point, 13 parts of an aqueous urea-formaldehyde concentrate containing 85% by weight of urea and formaldehyde, which were present therein in a weight ratio of 26 parts of urea to 59 parts of formaldehyde, were added to the solution. The resulting mixture was then mixed for 5 minutes, whereupon 8.3 parts of urea and 0.5 part of alkali were added to the solution and mixed for 30 minutes at a temperature of 160° F., thereby yielding a solution having a pH of 11.2.

The amylose solution obtained from the above procedure was stable for 3 days, thereafter forming a clear gel. This gel, on heating in a boiling water bath for 1 hour or an adding a small amount of water, formed a clear solution which remained stable for 1 week, and, on mixing with other additives, such as cooked starch, raw starch slurries, and the like, the amylose solution remained stable for extended periods of time. It is to be noted that amylose solutions stabilized by urea-formaldehyde systems which have gelled but which remain relatively clear can be made fluid again by reheating in a boiling water bath with a slight amount of added water. The amylose solution obtained from the above procedure yielded films that exhibited excellent characteristics of flexibility, water resistance, gloss, hardness, and heat sealability.

(c) A slurry of 200 parts of water, 22.2 parts of amylose, and 13 parts of an aqueous urea-formaldehyde concentrate containing 85% by weight of urea and formaldehyde, which were present therein in a weight ratio of 26 parts of urea to 59 parts of formaldehyde, was heated for 10 minutes in a boiling water bath. Then a 100 cc. portion of the slurry was placed in an autoclave and heated at a temperature of 330° F. and at a gauge pressure of 90 p.s.i. for 20 minutes. At the completion of the pressure treatment, the autoclave was cooled by immersion in a boiling water bath for 3 minutes. The clear cooked solution was then added to a container immersed in a water bath maintained at a temperature of 160° F. and mixed for 5 minutes. Then 8.3 parts of urea and 0.5 part of sodium hydroxide were added to the solution and mixed for 30 minutes at a temperature of 160° F. yielding a solution having a pH of 11.3.

The amylose solution obtained from the above procedure was stable for 3 days, thereafter forming a clear gel. This gel, on heating in a boiling water bath for 1 hour or on adding a small amount of water, formed a clear solution which remained stable for 1 week, and, on mixing with other additives, such as cooked starch, raw starch slurries, and the like, the amylose solution remained stable for extended periods of time. In addition, among the desirable characteristics shown by films cast from this solution were included flexibility, water resistance, glass, hardness, and heat sealability.

(d) A slurry of 100 parts of water, 13 parts of amylose, and 2.2 parts of sodium hydroxide was heated at 140° F. for 5 minutes in order to disperse the amylose. Then 4.5 parts of an aqueous urea-formaldehyde concentrate containing 85% by weight of urea and formaldehyde, which were present therein in a weight ratio of 26 parts of urea to 59 parts of formaldehyde, were added to the solution, the resulting mixture being heated at 140° F. for 30 minutes, yielding a solution having a pH of 12.

The amylose solution obtained from the above procedure was stable for 1 week, and, on mixing with other additives, such as cooked starch, raw starch slurries, and the like, the amylose solution remained stable for extended periods of time. In addition, among the desirable characteristics shown by films cast from this solution were included flexibility, water resistance, gloss, hardness, and heat sealability.

(e) A slurry of 100 parts of water, 13 parts of amylose, and 2.2 parts of sodium hydroxide was heated at 140° F. for 5 minutes in order to disperse the amylose. Then 2.3 parts of urea and 4.5 parts of an aqueous urea-formaldehyde concentrate containing 85% by weight of urea and formaldehyde, which were present therein in a weight ratio of 26 parts of urea to 59 parts of formaldehyde, were added to the solution, the resulting mixture being heated at 140° F. for 30 minutes, yielding a solution having a pH of 12.

The amylose solution obtained from the above procedure was stable for 1 week and, on mixing with other additives, such as cooked starch, raw starch slurries and the like, the amylose solution remained stable for extended periods of time. In addition, among the desirable characteristics shown by films cast from this solution were included flexibility, water resistance, gloss, hardness, and heat sealability.

*Example VIII*

This example illustrates the necessity of utilizing all of the components of my stabilizing mixture in order to obtain stable amylose solutions from which may be derived films exhibiting enhanced physical properties.

(a) The procedure as set forth in Example I was followed with the exception that the amounts of paraformaldehyde, urea, and alkali were varied, as set forth in the table appearing below. In addition, in formulations 1 and 3, the alkali was added in two portions of 1.5 ml. each. The first portion was added to the solution when it was immersed in a 160° F. water bath. The second portion was added after the solution had been cooled to 100° F. These separate additions were employed in order to prevent degradation of the amylose by the alkali at the elevated temperatures used.

| Formulation No. | Initial composition of slurry | | | Stabilization treatment of pressure cooked amylose solution | | |
| --- | --- | --- | --- | --- | --- | --- |
| | Water | Amylose | Paraformaldehyde | Urea | Sodium hydroxide | pH |
| 1 | 200 | 22.2 | | | 3.0 | 11.5 |
| 2 | 200 | 22.2 | 7.76 | | 1.5 | 10.8 |
| 3 | 200 | 22.2 | 7.76 | | 3.0 | 11.8 |
| 4 | 200 | 22.2 | 7.76 | 11.5 | 0.5 | 10.4 |

Of the four formulations tested, only the last preparation incorporating all of the components of my stabilizer mixture exhibited stability when mixed with other additives, such as cooked starch, raw starch slurries, clay slips, and the like. Moreover, this last preparation was the only formulation that gave rise to films possessing improved properties of flexibility, water resistance, gloss, hardness, and heat sealability.

(b) In each of the formulations set forth hereinafter, a slurry of water, amylose (or pearl corn starch, as in formulation 4) and alkali was heated at 140° F. for 10 minutes. Then the stabilizer mixture, if any was utilized, was added to the amylose solution, 480 parts of water (at a temperature of 80° F.) were added to dilute the solution, and 160 parts of a raw corn starch slurry were mixed with the amylose solution for 30 minutes at a temperature of 100° F.

| Formulation No. | Initial composition of slurry | | | | Stabilizer mixture for the dispersed amylose solution | | | |
| --- | --- | --- | --- | --- | --- | --- | --- | --- |
| | H₂O | Amylose | Pearl corn starch | Sodium hydroxide | Urea | Paraformaldehyde | pH | Stability with raw corn starch slurries |
| 1 | 230 | 30 | | 5.0 | | | 11.5 | Unstable. |
| 2 | 230 | 30 | | 5.0 | | 6.0 | 11.8 | Do. |
| 3 | 230 | 30 | | 5.0 | 8.0 | 6.0 | 11.4 | Stable. |
| 4 | 230 | | 30 | 5.0 | | | 12.3 | Do. |

Of the formulations tested containing amylose, only those incorporating all of the components of my stabilizer mixture exhibited stability when mixed with the raw corn starch slurry. The pearl corn starch mixture was also stable in raw corn starch slurries, therefore establishing that the instability of the unstabilized amylose formulations in starch slurries is to be attributed to the instability of amylose, rather than to the effect of alkali upon the raw starch.

*Example IX*

This example illustrates the use of various salts in the process of my invention, whereby a pressure cooked amylose solution is stabilized.

The procedure as set forth in Example I was followed with the exception that various salts were added to the slurry before pressure treatment. The various formulations employed are set forth in the table appearing below.

| Formulation No. | Initial composition of slurry | | | | | Stabilization treatment of pressure cooked amylose solution | | |
|---|---|---|---|---|---|---|---|---|
| | Water | Amylose | Paraform-aldehyhe | Salt (type) | Salt (parts) | Urea | Sodium hydroxide | pH |
| 1 | 200 | 22.2 | 7.76 | Sodium chloride | 4.0 | 16 | 0.5 | 9.0 |
| 2 | 200 | 22.2 | 7.76 | Sodium nitrate | 4.0 | 16 | 0.5 | 8.8 |
| 3 | 125 | 100 | 35 | ___do___ | 13 | 75 | 0.5 | 8.3 |
| 4 | 200 | 22.2 | 7.76 | Potassium chloride | 4.0 | 16 | 0.5 | 8.0 |

In each formulation set forth in the above table, amylose solutions were obtained which exhibited excellent stability, and which, on mixing with other additives, such as cooked starch, raw starch slurries, and the like, remained stable for extended periods of time. In addition, among the desirable characteristics shown by films cast from these solutions were included strength, flexibility, water resistance, gloss, hardness, and heat sealability.

*Example X*

This example illustrates the use of ammonium hydroxide as well as various salts in the stabilizing system of my invention, whereby solutions of amylose dispersed by pressure cooking were stabilized.

The procedure as set forth in Example I was followed with the exception that various salts were added to the stabilized amylose solutions. The various formulations employed are set forth in the table appearing below.

as cooked starch, raw starch slurries, and the like, remained stable for extended periods of time. The formulation wherein ammonium chloride was used was stable for a shorter period than those formulations employing other salts. Among the desirable characteristics shown by films cast from these solutions were included strength, flexibility, water resistance, gloss, hardness, and heat sealability.

*Example XI*

This example illustrates the use of various salts in the stabilizing system of my invention, whereby solutions of amylose dispersed by alkali treatment at atmospheric pressure rather than by high pressure treatment were stabilized.

The procedure as set forth in Example II was followed with the exception that various salts were added either before or after (as desired) the stabilization step. The various formulations employed are set forth in the table appearing below:

| Formulation No. | Water | Amylose | Salt (type) | Salt (amt.) | Sodium Hydroxide | Urea | Paraform-aldehyde | Salt (type) | Salt (amt.) | pH |
|---|---|---|---|---|---|---|---|---|---|---|
| 1 | 230 | 30 | Sodium chloride | 2.4 | 5.0 | 8.0 | 6.0 | | | 11.2 |
| 2 | 230 | 30 | Sodium nitrate | 2.4 | 5.0 | 8.0 | 6.0 | | | 11.1 |
| 3 | 230 | 30 | Potassium chloride | 2.4 | 5.0 | 8.0 | 6.0 | | | 11.4 |
| 4 | 230 | 30 | | | 5.0 | 8.0 | 6.0 | Sodium chloride | 16.0 | 11.1 |
| 5 | 230 | 30 | | | 5.0 | 8.0 | 6.0 | Sodium nitrate | 2.4 | 11.2 |
| 6 | 230 | 30 | | | 5.0 | 8.0 | 6.0 | Potassium chloride | 2.4 | 11.5 |

In each formulation set forth in the above table, amylose solutions were obtained which exhibited excellent stability, and which, on mixing with other additives, such as cooked starch, raw starch slurries, and the like, remained stable for extended periods of time. Among the desirable characteristics shown by films cast from these solutions were included strength, flexibility, water resistance, gloss, hardness, and heat sealability.

Any departure from the above description which conforms to the present invention is intended to be included within the scope of the invention as defined by the following claims.

I claim:

1. A method for the stabilization of aqueous amylose solutions which comprises mixing, under alkaline pH conditions, an aqueous amylose dispersion with: (a) a mem-

| Formulation No. | Composition of stabilized amylose solutions | | | | Original pH | Urea | Salt (type) | Salt (amt.) | Final pH |
|---|---|---|---|---|---|---|---|---|---|
| | Water | Amylose | Paraform-aldehyde | Sodium hydroxide | | | | | |
| 1 | 200 | 22.2 | 7.76 | 0.5 | 10.2 | 16 | Sodium chloride | 28 | 8.8 |
| 2 | 200 | 22.2 | 7.76 | 0.5 | 10.2 | 16 | Sodium acetate | 28 | 9.2 |
| 3 | 200 | 22.2 | 7.76 | 0.5 | 10.2 | 16 | Sodium sulfate | 14 | 9.4 |
| 4 | 200 | 22.2 | 7.76 | 0.5 | 10.2 | 16 | Sodium nitrate | 17 | 8.0 |
| 5 | 200 | 22.2 | 7.76 | 0.5 | 10.2 | 16 | Potassium chloride | 25 | 9.0 |
| 6 | 200 | 22.2 | 7.76 | 0.5 | 10.2 | 16 | Ammonium chloride | 1.4 | 7.0 |
| 7 | 200 | 22.2 | 7.76 | 0.5 | 10.2 | 16 | Calcium chloride | 2.0 | 7.0 |
| 8 | 200 | 22.2 | 7.76 | 0.5 | 10.2 | 16 | Ammonium hydroxide | 2.0 | 12.5 |

In each formulation set forth in the above table, amylose solutions were obtained which exhibited excellent stability, and which, on mixing with other additives, such ber selected from the group consisting of paraformaldehyde, aqueous solutions of methanol stabilized formaldehyde, aqueous solutions of formaldehyde, and (b) a member selected from the group consisting of urea, monomethylol urea, succinamide and adipamide.

2. The method of claim 1, in which the member of group (a) is partially replaced, to an extent no greater than 60% by weight of said member, by an aldehyde selected from the class consisting of glyoxal, acetaldehyde, furfural and benzaldehyde.

3. The method of claim 1, in which the member of group (b) is partially replaced, to an extent no greater than 50% by weight of said member, by a member selected from the class consisting of thiourea, cyclic urea compounds, trimethylol alkyl compounds, trimethylol aryl compounds, dicyandiamide, melamine, hydrazine hydrate, morpholine, ethylene glycol, water soluble alcohols, ketones, primary amines, and secondary amines.

4. The method for the stabiliaztion of aqueous amylose solutions which comprises mixing, under alkaline pH conditions, an aqueous amylose dispersion with paraformaldehyde and urea, the mole ratio of paraformaldehyde to urea being within the range 1:3 to 4:1.

5. The method of claim 4 in which the pH is at least 9.5.

6. The method of claim 4 wherein the amylose is derived from the separation of the amylose and amylopectin components of whole starch.

7. The method of claim 4 wherein the amylose is derived from whole starch containing at least 55% amylose.

8. The method for the stabilization of aqueous amylose solutions which comprises mixing an aqueous amylose dispersion with paraformaldehyde, urea, and a salt selected from the group consisting of ammonium, alkali metal and alkaline earth metal salts, the mole ratio of paraformaldehyde to urea being within the range 1:3 to 4:1.

9. The method for the stabilization of aqueous amylose solutions which comprises mixing an aqueous amylose dispersion, under alkaline pH conditions, with a non-polymeric urea-formaldehyde concentrate.

10. A stabilized amylose solution comprising an aqueous solution, maintained at an alkaline pH, of dispersed amylose and (a) a member selected from the group consisting of paraformaldehyde, aqueous solutions of methanol stabilized formaldehyde, aqueous solutions of formaldehyde, and (b) a member selected from the group consisting of urea, monomethylol urea, succinamide and adipamide.

11. The stabilized amylose solution of claim 10 in which the member of group (a) is partially replaced, to an extent no greater than 60% by weight of said member, by an aldehyde selected from the class consisting of glyoxal, acetaldehyde, furfural and benzaldehyde.

12. The stabilized amylose solution of claim 10 in which the member of group (b) is partially replaced, to an extent no greater than 50% by weight of said member, by a member selected from the class consisting of thiourea, cyclic urea compounds, trimethylol alkyl compounds, trimethylol aryl compounds, dicyandiamide, melamine, hydrazine hydrate, morpholine, ethylene glycol, water soluble alcohols, ketones, primary amines, and secondary amines.

13. A stabilized amylose solution comprising an aqueous solution of dispersed amylose, paraformaldehyde, and urea, said solution being maintained at an alkaline pH, the mole ratio of paraformaldehyde to urea being within the range 1:3 to 4:1.

14. The solution of claim 13 wherein the pH of said solution is at least 9.5.

15. The solution of claim 13 wherein the amylose is derived from the separation of the amylose and amylopectin components of whole starch.

16. The solution of claim 13 wherein the amylose is derived from whole starch containing at least 55% amylose.

17. A stabilized amylose solution comprising an aqueous solution of dispersed amylose, paraformaldehyde, urea, and a salt selected from the group consisting of ammonium, alkali metal, and alkaline earth metal salts, the mole ratio of paraformaldehyde to urea being within the range 1:3 to 4:1.

18. A stabilized amylose solution comprising an aqueous solution of dispersed amylose and a non-polymeric urea-formaldehyde concentrate, said solution being maintained at an alkaline pH.

References Cited by the Examiner

UNITED STATES PATENTS

| | | | |
|---|---|---|---|
| 2,566,842 | 9/1951 | Landes et al. | 106—213 |
| 2,801,184 | 7/1957 | Miyamoto | 106—213 |
| 3,081,181 | 3/1963 | Rutenberg et al. | 106—210 |

FOREIGN PATENTS 772,479   4/1957   Great Britain.

ALEXANDER H. BRODMERKEL, *Primary Examiner.*

JOSEPH REBOLD, *Examiner.*